United States Patent

Zhou et al.

(10) Patent No.: US 9,003,796 B2
(45) Date of Patent: Apr. 14, 2015

(54) HEAT RECOVERY USING ORGANIC RANKINE CYCLE

(75) Inventors: Qiong Zhou, Houston, TX (US); Deila Peng, Houston, TX (US); Arnaldo Frydman, Houston, TX (US); Thomas Glen Cobb, Houston, TX (US)

(73) Assignee: General Electric Company, Schenectady, NY (US)

( * ) Notice: Subject to any disclaimer, the term of this patent is extended or adjusted under 35 U.S.C. 154(b) by 284 days.

(21) Appl. No.: 13/489,288

(22) Filed: Jun. 5, 2012

(65) Prior Publication Data

US 2013/0318969 A1    Dec. 5, 2013

(51) Int. Cl.
| | |
|---|---|
| F01K 25/08 | (2006.01) |
| F02C 6/00 | (2006.01) |
| F02G 1/00 | (2006.01) |
| F02G 3/00 | (2006.01) |
| F01K 25/06 | (2006.01) |
| F01K 25/00 | (2006.01) |
| F02C 7/00 | (2006.01) |
| F01K 23/06 | (2006.01) |

(52) U.S. Cl.
CPC .............. *F01K 23/068* (2013.01); *F01K 25/08* (2013.01); *Y02E 20/14* (2013.01); *Y02E 20/16* (2013.01); *Y02E 20/18* (2013.01)

(58) Field of Classification Search
CPC ..... F01K 23/10; F01K 23/068; F01K 23/067; F25J 2240/70; Y02E 20/18; Y02E 20/16
USPC .......................................... 60/649, 651, 671
See application file for complete search history.

(56) References Cited

U.S. PATENT DOCUMENTS

| | | | |
|---|---|---|---|
| 6,032,467 A | 3/2000 | Oshita et al. | |
| 6,058,695 A | 5/2000 | Ranasinghe et al. | |
| 6,065,283 A * | 5/2000 | Shouman | 60/39.182 |
| 6,116,028 A * | 9/2000 | Hansen et al. | 60/651 |
| 6,158,220 A * | 12/2000 | Hansen et al. | 60/649 |
| 6,195,998 B1 * | 3/2001 | Hansen et al. | 60/651 |
| 6,216,436 B1 | 4/2001 | Ranasinghe et al. | |
| 7,278,264 B2 | 10/2007 | Brostow | |
| 7,934,383 B2 | 5/2011 | Gutierrez et al. | |
| 2004/0083731 A1 * | 5/2004 | Lasker | 60/645 |
| 2010/0293918 A1 | 11/2010 | Gulko et al. | |

FOREIGN PATENT DOCUMENTS

| | | |
|---|---|---|
| DE | 102009022491 A1 | 1/2011 |
| EP | 0211335 A1 | 2/1987 |
| EP | 2503111 A1 | 9/2012 |

(Continued)

OTHER PUBLICATIONS

U.S. Appl. No. 13/215,090, filed Aug. 22, 2011, Kidambi et al.

(Continued)

*Primary Examiner* — Christopher Jetton
*Assistant Examiner* — Daniel Wagnitz
(74) *Attorney, Agent, or Firm* — Fletcher Yoder P.C.

(57) ABSTRACT

A system includes a heat exchanger and an organic Rankine cycle system. The heat exchanger is configured to exchange heat between extraction air from a power block and nitrogen from an air separation unit. The organic Rankine cycle system is coupled to the heat exchanger. In addition, the organic Rankine cycle system is configured to convert heat from the extraction air into work.

20 Claims, 3 Drawing Sheets

(56) References Cited

FOREIGN PATENT DOCUMENTS

| | | | |
|---|---|---|---|
| EP | 2562373 | A1 | 2/2013 |
| GB | 2318833 | A | 5/1998 |
| WO | 0031381 | A2 | 6/2000 |

OTHER PUBLICATIONS

PCT Search Report and Written Opinion dated Aug. 16, 2031 from corresponding Application No. PCT/US2013/040131.

\* cited by examiner

HEAT RECOVERY USING ORGANIC RANKINE CYCLE

BACKGROUND OF THE INVENTION

The subject matter disclosed herein relates to gasification systems, and more specifically, to systems and methods for heat integration of gasification systems.

Gasification systems generate synthesis gas (syngas) that can be used for a variety of purposes, such as power production or chemical synthesis. For example, integrated gasification combined cycle (IGCC) power plants may generate electricity from various carbonaceous feed stocks, such as coal or natural gas. However, generating syngas using typical IGCC processes may generate a large amount of waste heat, thereby decreasing the efficiency of the IGCC power plant.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a heat exchanger and an organic Rankine cycle (ORC) system. The heat exchanger is configured to exchange heat between extraction air from a power block and nitrogen from an air separation unit. The organic Rankine cycle system is coupled to the heat exchanger. In addition, the organic Rankine cycle system is configured to convert heat from the extraction air into work.

In a second embodiment, a system includes an ORC system. The ORC system includes a closed refrigerant loop configured to transport refrigerant in a cycle. The ORC system also includes a pump, an evaporator, a turbine, and a condenser. The pump is configured to increase a pressure of the refrigerant. The evaporator is coupled to the closed refrigerant loop and an extraction air conduit. In addition, the evaporator is configured to evaporate the refrigerant from the pump by exchanging heat with extraction air from a power block of a gasification system. The turbine is configured to extract work from the refrigerant from the evaporator to power a load. The condenser is configured to condense the refrigerant from the turbine.

In a third embodiment, a method includes compressing a working fluid using a compressor. The method also includes evaporating the working fluid by exchanging a first heat with extraction air from a power block of a gasification system using a first heat exchanger. In addition, the method includes expanding the working fluid to extract work using a turbine and condensing the working fluid by exchanging a second heat with cooling water using a second heat exchanger.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Presently disclosed embodiments are directed to systems and methods to recover low grade heat from gasification systems, such as IGCC power plants, chemical plants, and the like. In general, extraction air from a power block is cooled before being directed to an air separation unit. Accordingly, an ORC may be disposed between the power block and the air separation unit to extract heat from the extraction air. The ORC contains a turbine to convert the extracted heat into work (e.g., electrical power). Thus, the novel use of the ORC to remove heat from the extraction air may improve the efficiency of the IGCC power plant.

Figure 1:
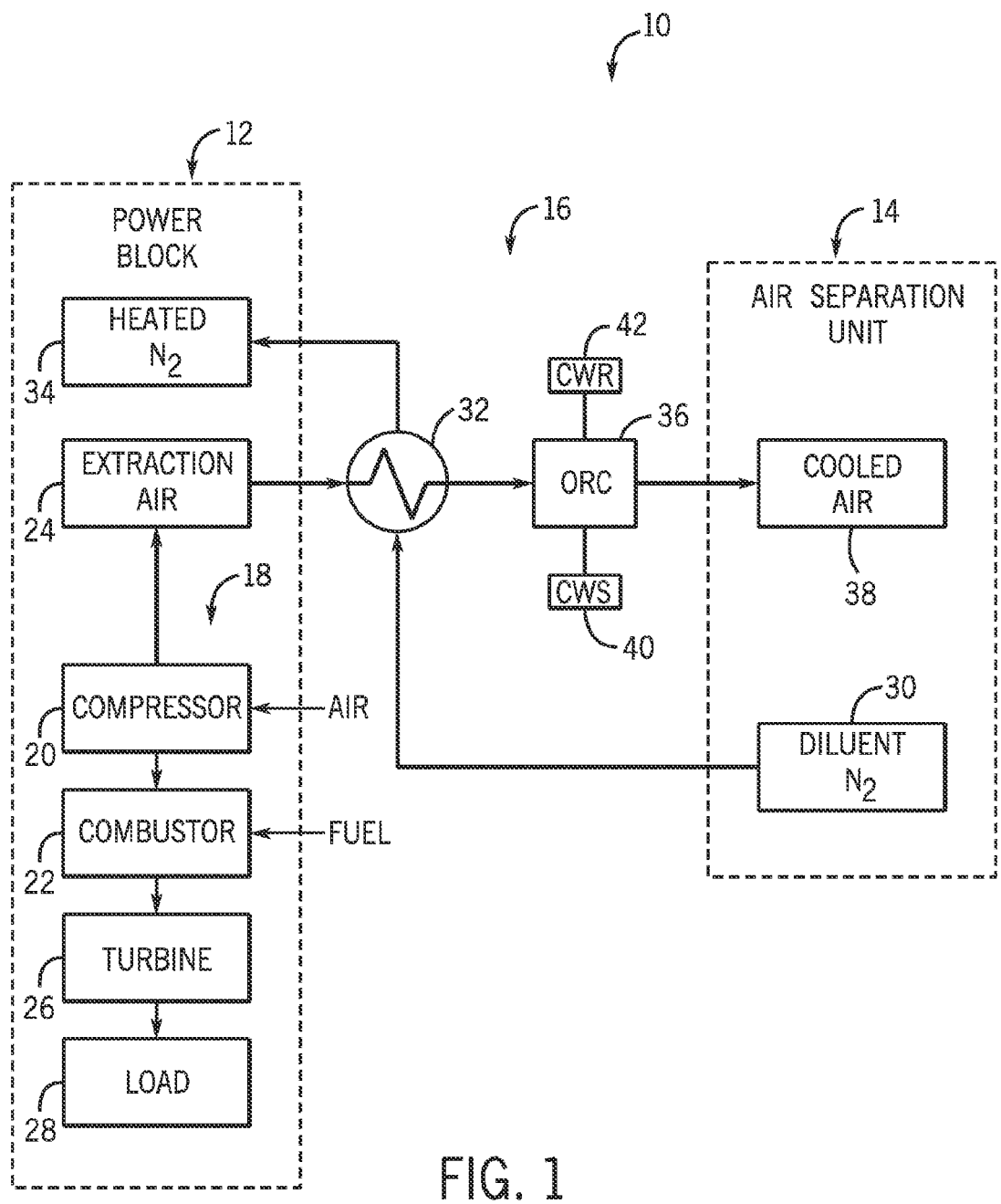
FIG. 1 is a schematic diagram of an embodiment of an IGCC power plant with an ORC to recover waste heat from extraction air.

Turning now to the figures, FIG. 1 illustrates a portion of an embodiment of a gasification system (e.g., IGCC power plant 10). In general, the IGCC power plant 10 converts a fuel source into syngas through the use of a gasifier. The gasifier may combine a fuel source (e.g., coal slurry) with steam and oxygen to produce syngas. The oxygen may be provided by an air separation unit. The air separation unit may condense compressed air at low temperatures in order to separate the nitrogen, oxygen, and other component gases of air. The product syngas may be provided to a combustor to combust the syngas with oxygen in order to drive one or more gas turbines. Heat from the IGCC power plant 10 may also be used to drive one or more steam turbines. The one or more turbines may drive generators to produce electricity.

The IGCC power plant 10 includes a plurality of components for producing syngas (e.g., gasifiers, gas turbines, coal grinders, slag handlers, strippers, absorbers, and/or the like). These components are omitted from FIG. 1 for clarity. As shown, the IGCC power plant 10 has a power block 12, an air separation unit 14, and a heat integration system 16 disposed in between. The power block 12 is configured to generate power using, for example, syngas produced by the IGCC power plant 10. The power block may include components such as gas turbines, steam turbines, heat recovery systems, and the like. The air separation unit 14 is configured to separate air into its primary components (e.g., nitrogen and oxygen) for later use in the IGCC power plant 10. In certain embodiments, the air separation unit 14 may include cryogenic cooling systems, distillation columns, and other equipment for separating air into its components.

The illustrated power block 12 includes a gas turbine engine 18 for generating power. As illustrated, the gas turbine engine 18 includes a compressor 20, a combustor 22, and a turbine 26. Air enters the compressor 20, where the air is compressed. The air is then fed into the combustor 22. A portion of the air (e.g., extraction air 24) is extracted from the compressor 20 for use in the air separation unit 14, as will be described further below. Within the combustor 22, fuel (e.g., syngas) and the air mix to form a combustible mixture. The mixture combusts, forming combustion products and releasing heat. The combustion products are then directed to the turbine 26, which extracts work from the combustion products to provide power for a load 28. In certain embodiments, the load 28 may be an electric generator or any device capable of utilizing the mechanical energy extracted from the turbine 26.

As noted above, the power block 12 supplies the extraction air 24 to the air separation unit 14. Similarly, the air separation unit 14 supplies diluent nitrogen 30 for use in the power block 12. The power block 12 may operate more efficiently when the diluent nitrogen 30 is heated, and the air separation unit 14 may operate more efficiently when the extraction air 24 is cooled. The heat integration system 16 provides respective heating and cooling of the diluent nitrogen 30 and extraction air 24 to improve the efficiency of the IGCC power plant 10. To this end, the heat integration system 16 includes a heat exchanger 32 (i.e., diluent nitrogen/extraction air heat exchanger) to respectively heat and cool the diluent nitrogen 30 and extraction air 24. In particular, diluent nitrogen 30 flows through the heat exchanger 32, where the diluent nitrogen 30 absorbs heat from the extraction air 24 and enters the power block 12 as heated nitrogen 34. Similarly, extraction air 18 flows through the heat exchanger 22, where the extraction air 24 releases heat to the diluent nitrogen 30. The extraction air 24 then flows through an ORC 36, where the extraction air 24 releases more heat. Finally the extraction air 24 enters the air separation unit 14 as cooled air 38.

Although the heat exchanger 32 is illustrated as a shell and tube heat exchanger in FIG. 1, the design of the heat exchanger 32 may vary among embodiments. For example, the heat exchanger 32 may be a plate exchanger, a fin-fan exchanger, or another suitable type of exchanger. In addition, the flow arrangement of the extraction air 24 and the diluent nitrogen 30 may be concurrent or countercurrent. Through the heat exchanger, a countercurrent flow arrangement may enable greater approach temperatures at the inlets of the heat exchanger 32, whereas a concurrent flow arrangement may enable more uniform temperatures at the outlets of the heat exchanger 32. Accordingly, the design of the heat exchanger 32 may be implementation-specific and may vary among embodiments.

The heat integration system 16 improves the efficiency of the IGCC power plant 10 by utilizing internal streams of the IGCC power plant 10 as heat sources and/or heat sinks. In particular, the heat exchanger 32 enables heating of the diluent nitrogen 30 and cooling of the extraction air 24 without the usage of external utilities (e.g., cooling water, steam, or electricity). In certain embodiments, it may be desirable to reduce the usage of external utilities to improve the efficiency of the IGCC power plant 10. For example, the air separation unit 14 may be generally inefficient due to the amount of energy used to cool and separate air. The heat recovery and power generation of the ORC 36 may reduce operating costs associated with the air separation unit 14.

Figure 2:
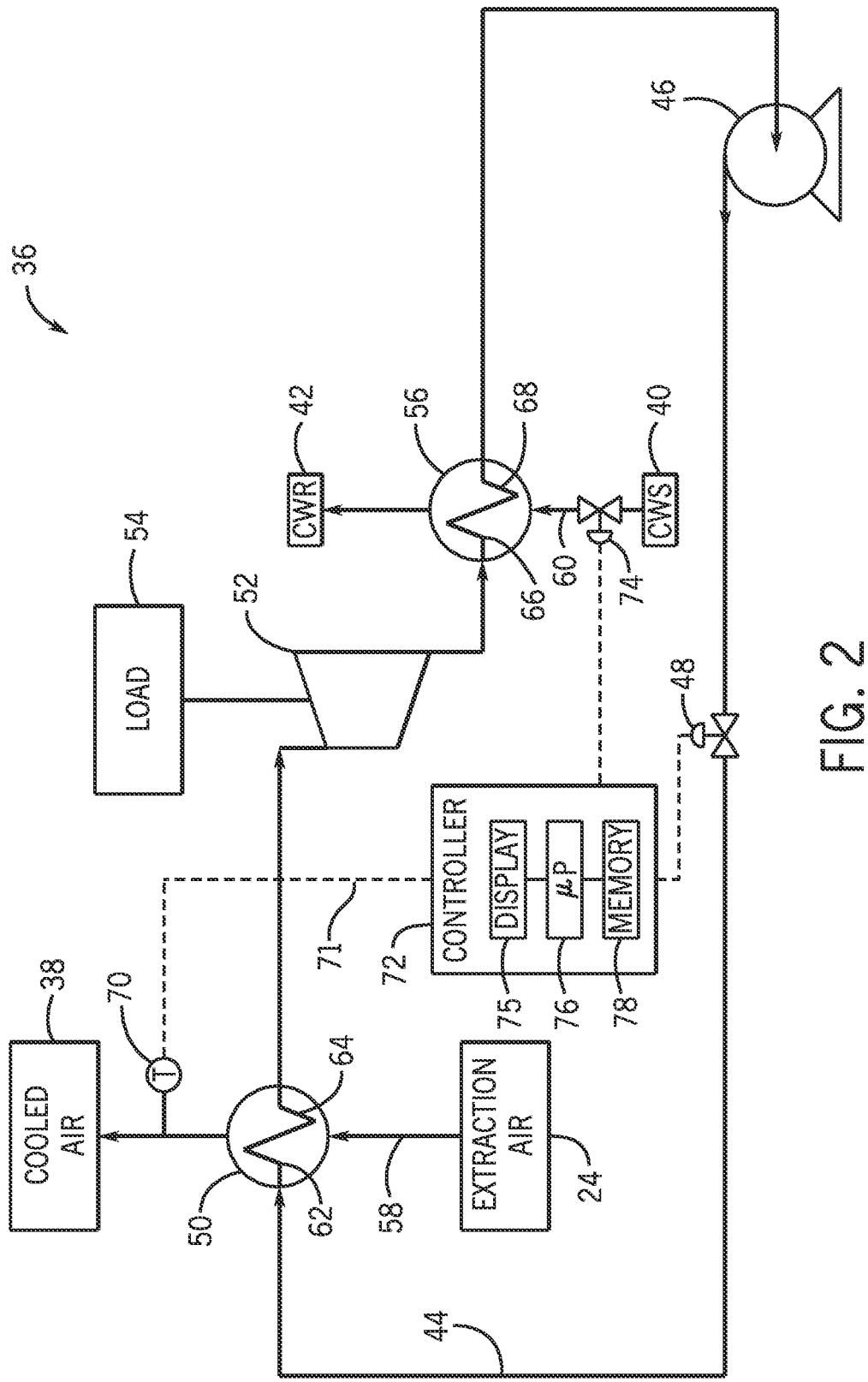
FIG. 2 is a schematic diagram of an embodiment of the ORC of FIG. 1, in accordance with aspects of the present techniques.

The heat integration system includes the ORC 36, which absorbs heat from the extraction air 24 and converts the heat into work, as will be further described in FIG. 2. The ORC is coupled to a cooling water source (CWS) 40 and a cooling water return (CWR) 42. As illustrated, the ORC 36 is disposed downstream of the heat exchanger 32. Accordingly, heat from the extraction air is removed first by the heat exchanger 32, and secondly by the ORC 36. The illustrated arrangement may enable additional cooling of the extraction air 24. However, other flow arrangements, such as disposing the ORC 36 upstream of the heat exchanger 32, may be used in other embodiments.

FIG. 2 illustrates an embodiment of the ORC 36 of FIG. 1. The ORC 36 includes a closed piping loop 44 (e.g., closed refrigerant loop) that is configured to transport a working fluid (e.g., refrigerant) between components of the ORC 36. In certain embodiments, the refrigerant may be a hydrocarbon component (e.g., propane or isobutane), a fluorocarbon (e.g., R-22), an inorganic component (e.g., ammonia or sulfur dioxide), or a hybrid mixture of these components. The type of refrigerant used in the ORC 36 may be selected based on one or more properties of the extraction air 24, such as temperature, pressure, specific heat, and/or the like. For example, if the temperature of the extraction air 24 exiting the power block 12 is relatively high, certain refrigerants may be more suitable for the ORC 36 than others.

As shown, the ORC 36 includes a pump 46 disposed in the closed piping loop 44. The pump 46 is configured to increase the pressure of the refrigerant and to provide the driving force to transport the refrigerant between the components of the ORC 36. From the pump 46, the refrigerant flows downstream through a control valve 48. As will be discussed further below, the control valve 48 may throttle or block flow of the refrigerant. The refrigerant then flows to an evaporator 50, where the refrigerant exchanges heat with the extraction air 24 of FIG. 1. In particular, the refrigerant may absorb heat from the extraction air 24, causing the refrigerant to evaporate. The vaporized refrigerant then flows to an expander (e.g., turbine 52), where the refrigerant is expanded to extract work to power a load 54. In certain embodiments, the load 54 may be an electric generator and may contribute to the electricity generation of the IGCC power plant 10. As a result, the efficiency of the IGCC power plant 10 may increase when the ORC 36 is operating. From the turbine 52, the vapor refrigerant is directed to a condenser 56, where the refrigerant exchanges heat with cooling water from the CWS 40 of FIG. 1. In particular, the refrigerant may expel heat to the cooling water, causing the refrigerant to condense into a liquid phase. The liquid refrigerant then returns to the pump 46, where the cycle may begin again.

Again, although the evaporator 50 and the condenser 56 are illustrated in FIG. 2 as shell and tube heat exchangers, their respective designs may vary. For example, the evaporator 50 may be a falling film evaporator or a natural circulation evaporator. In addition, the flow configurations of the evaporator 50 and the condenser 56 may vary. As illustrated, the extraction air 24 flows through an extraction air conduit 58, which is coupled to the evaporator 50. The extraction air conduit 58 and the closed piping loop 44 may be configured such that the extraction air 24 and the refrigerant exchange heat in a countercurrent or concurrent arrangement in the evaporator 50. Similarly, a cooling water conduit 60 is coupled to the condenser 56, and heat exchange between the cooling water and the refrigerant may utilize a countercurrent or concurrent design. Still further, the flow paths of the evaporator 50 and the condenser 56 may vary. As illustrated, the refrigerant flows through a tube side 62 of the evaporator 50, whereas the extraction air 24 flows through a shell side 64 of the evaporator 50. In certain embodiments, the refrigerant may flow through the shell side while the extraction air 24 flows through the tube side. Similarly, a tube side 66 and a shell side 68 of the condenser may be swapped according to design-specific implementations. As illustrated, the refrigerant flows through the tube side 66 of the condenser 56, whereas the cooling water flows through the shell side 68. In certain embodiments, the refrigerant may flow through the shell side while the cooling water flows through the tube side.

As may be appreciated, the efficiency of the ORC 36 or the IGCC power plant 10 may be affected by a temperature of the cooled air 38 (i.e., the temperature of the extraction air 24 exiting the evaporator 50). Accordingly, it may be desirable to monitor and control the temperature of the cooled air 38. To this end, the ORC 36 may include a temperature sensor 70 coupled to the extraction air conduit 58 downstream of the evaporator 50. The temperature sensor 70 is configured to measure the temperature of the cooled air 38 (i.e., the extraction air 24 exiting the evaporator 50). The ORC 36 may also include a controller 72 (e.g., programmable logic controller) that is configured to control the temperature of the cooled air 38. The controller 72 is communicatively coupled to the temperature sensor 70, the control valve 48 disposed in the closed piping loop 44, and/or a control valve 74 disposed in the cooling water conduit 60. Thus, the temperature sensor 70 may send a signal 71 to the controller 72 that is indicative of the cooled air temperature, and the controller 72 may adjust the control valves 48 and/or 74 based on the signal 71. Although the controller 72 is illustrated as controlling both control valves 48 and 74, in certain embodiments, the control arrangement may vary. For example, the ORC 36 may include two controllers, with each controller configured to control one of the control valves 48 or 74.

As noted above, the control valve 48 may throttle or block flow of the refrigerant to adjust the temperature of the cooled air 38. Reducing the refrigerant flow may reduce the amount of cooling available to the extraction air 24, thereby increasing the temperature of the cooled air 38. Conversely, increasing the refrigerant flow may increase the temperature of the cooled air 38. Additionally or alternatively, the control valve 74 may throttle or block flow of the cooling water to adjust the temperature of the cooled air 38. Reducing the cooling water flow may increase the temperature of the refrigerant, thereby reducing the amount of cooling available to the extraction air 24 and increasing the temperature of the cooled air 38. Increasing the cooling water flow may have the opposite effect. In certain embodiments, the control valves 48 and 74 may be used separately or together in combination to control the temperature of the cooled air 38 to improve the efficiency of the ORC 36 and the IGCC power plant 10.

The controller 72 includes various components that may allow for operator interaction with the ORC 36. For example, the controller 72 includes a display 75. The display 75 is configured to display graphics, buttons, icons, text, and similar features relating to information about the ORC 36. In certain embodiments, an operator may input information to the ORC 36 through the display 75. For example, the operator may set a temperature setpoint for the cooled air 38. The controller 72 may adjust one or both of the control valves 48 and 74 in order to adjust the temperature of the cooled air 38 towards the temperature setpoint.

The controller 72 also includes one or more processors 76 and/or other data processing circuitry, such as memory 78, to execute instructions to control the temperature of the cooled air 38. These instructions may be encoded in software programs that may be executed by the one or more processors 76. Further, the instructions may be stored in a tangible, non-transitory, computer-readable medium, such as the memory 78. The memory 78 may include, for example, random-access memory, read-only memory, rewritable memory, hard drive(s), and/or optical discs. In certain embodiments, the memory 78 may store parameters related to alarm setpoints of the ORC 36. Accordingly, the controller 72 may notify the operator when an alarm condition has occurred by displaying a message on the display 74.

Figure 3:
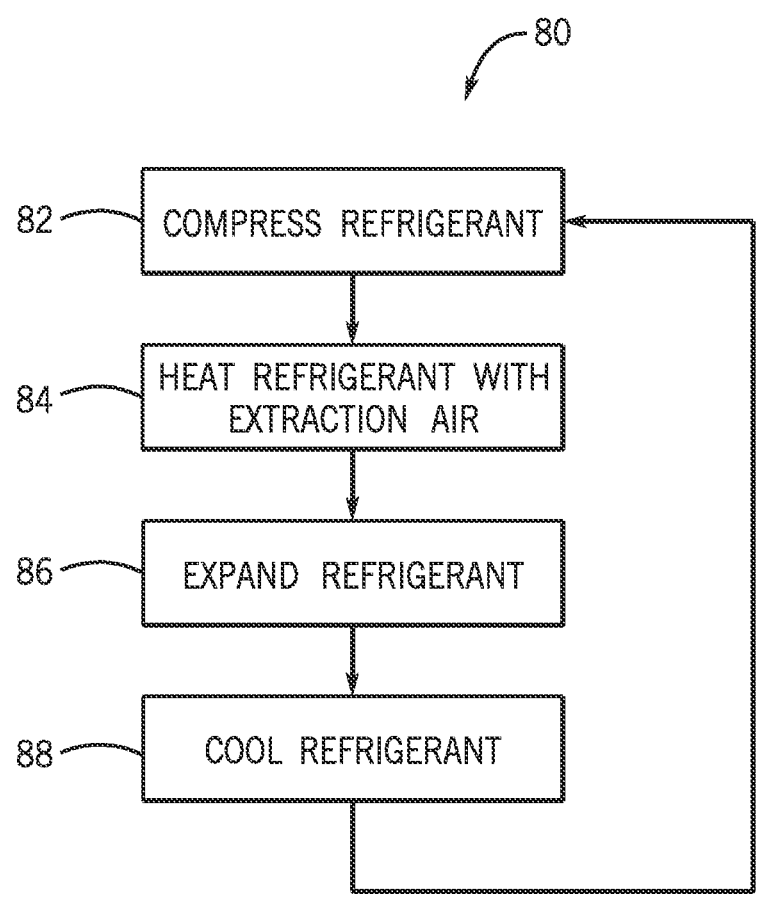
FIG. 3 is a flowchart of an embodiment of a method to recover waste heat from extraction air to improve the efficiency of an IGCC power plant.

FIG. 3 is a flowchart illustrating an embodiment of a method 80 to improve the efficiency of the IGCC power plant 10 by recovering waste heat from the extraction air 24 and converting the waste heat into electricity. The pump 46 compresses (block 82) a working fluid (e.g., refrigerant) to increase the pressure of the working fluid. The evaporator 50 heats (block 84) the working fluid by exchanging heat with the extraction air 24 from the power block 12. Consequently, the extraction air 24 is also cooled. The turbine 52 expands (block 86) the working fluid in order to extract work to power the load 54. As discussed above, the load 54 may be an electrical generator and may generally increase the efficiency of the IGCC power plant 10. The condenser 56 cools (block 88) the working fluid by exchanging heat with cooling water from the cooling water conduit 60. Consequently, the cooling water is also heated. In certain embodiments, the cooling water may be routed to a cooling tower or another external utility to remove excess heat. Once the working fluid has been cooled (block 88) by the condenser, the working fluid may continue to the pump 46 to be compressed (block 82), thereby continuing the ORC.

Technical effects of the invention include the novel use of an organic Rankine cycle (ORC) system to recover low grade heat from the extraction air of an IGCC power plant. Extraction air is extracted from a compressor of a gas turbine, cooled countercurrently with diluent nitrogen from an air separation unit, and further cooled within the ORC system. The ORC system contains a turbine to convert the heat extracted from the extraction air into work, thereby increasing the efficiency of the IGCC power plant. In addition, the amount of water used in the ORC system may be less than the amount of water used by traditional cooling water heat exchangers.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:
1. A system, comprising:
a power block configured to generate power;
an air separation unit configured to separate air into oxygen and nitrogen;
a heat exchanger configured to exchange heat between extraction air from the power block and the nitrogen from the air separation unit; and
an organic Rankine cycle system coupled to the heat exchanger, wherein the organic Rankine cycle system is configured to convert heat from the extraction air from the heat exchanger into work.

2. The system of claim 1, wherein the power block comprises a gas turbine engine having:
a compressor configured to compress air;
a combustor configured to receive fuel and the air from the compressor, and to combust the air and the fuel into combustion products; and
a turbine coupled to a load and configured receive the combustion products and to extract work from the combustion products.

3. The system of claim 2, wherein the compressor is configured to supply the extraction air from the power block to the air separation unit.

4. The system of claim 3, wherein the heat exchanger is configured to cool the extraction air from the compressor and to heat the nitrogen from the air separation unit.

5. The system of claim 1, wherein the heat exchanger is configured to exchange heat between the extraction air and the nitrogen in a countercurrent flow arrangement.

6. The system of claim 1, wherein the organic Rankine cycle system comprises:
a pump configured to increase a pressure of a refrigerant;
an evaporator configured to evaporate the refrigerant from the pump;
a turbine configured to extract work from the refrigerant from the evaporator to power a load; and
a condenser configured to condense the refrigerant from the turbine.

7. The system of claim 1, wherein the power block comprises a gas turbine engine configured to generate power, to supply the extraction air, and to receive the nitrogen.

8. The system of claim 1, wherein the air separation unit is configured to receive the extraction air from the power block, separate the extraction air into oxygen and the nitrogen, and to supply the nitrogen to the power block.

9. The system of claim 1, comprising an integrated gasification combined cycle (IGCC) power plant having the power block, the air separation unit, the heat exchanger, and the organic Rankine cycle system.

10. A system, comprising:
an organic Rankine cycle system, comprising:
a power block of a gasification system;
a closed refrigerant loop configured to transport a refrigerant in a cycle;
a pump configured to increase a pressure of the refrigerant;
an evaporator coupled to the closed refrigerant loop and an extraction air conduit, wherein the evaporator is configured to evaporate the refrigerant from the pump by exchanging heat with extraction air from the power block;
a turbine configured to extract work from the refrigerant from the evaporator to power a load; and
a condenser configured to condense the refrigerant from the turbine.

11. The system of claim 10, wherein the closed refrigerant loop and the extraction air conduit are coupled to the evaporator in a countercurrent flow arrangement.

12. The system of claim 10, comprising:
a temperature sensor coupled to the extraction air conduit and configured to measure a temperature of the extraction air;
a control valve configured to adjust an operating parameter of the organic Rankine cycle system; and
a controller configured to receive a signal from the temperature sensor and to adjust the control valve based on the signal.

13. The system of claim 12, wherein the control valve is disposed in the closed refrigerant loop downstream of the pump, and the control valve is configured to adjust a flow rate of the refrigerant to control the temperature of the extraction air.

14. The system of claim 12, wherein the condenser is coupled to a cooling water conduit, the control valve is disposed in the cooling water conduit, and the control valve is configured to adjust a flow rate of cooling water to control the temperature of the extraction air.

15. The system of claim 10, comprising the power block having a gas turbine engine and configured to generate power, to supply the extraction air, and to receive nitrogen.

16. The system of claim 10, comprising the air separation unit configured to receive the extraction air from the power block, to separate the extraction air into oxygen and the nitrogen, and to supply nitrogen to the power block.

17. A method, comprising:
compressing a refrigerant using a compressor;
evaporating the refrigerant by exchanging a first heat with extraction air from a power block of a gasification system using a first heat exchanger;
expanding the refrigerant to extract work using a turbine; and
condensing the refrigerant by exchanging a second heat with cooling water using a second heat exchanger.

18. The method of claim 17, comprising:
receiving a temperature setpoint at a controller for the extraction air leaving an evaporator;
sensing a temperature of the extraction air leaving the evaporator; and
adjusting a control valve to adjust the temperature of the extraction air towards the temperature setpoint.

19. The method of claim 18, comprising extracting the extraction air from the power block, wherein the power block comprises a gas turbine engine.

20. The method of claim 17, comprising cooling the extraction air with the working fluid using the first heat exchanger after cooling the extraction air with nitrogen using a third heat exchanger.

* * * * *